Aug. 24, 1943. H. N. FAIRBANKS ET AL 2,327,776
THREADING MECHANISM FOR MOTION PICTURE APPARATUS
Filed Aug. 22, 1941 2 Sheets-Sheet 1
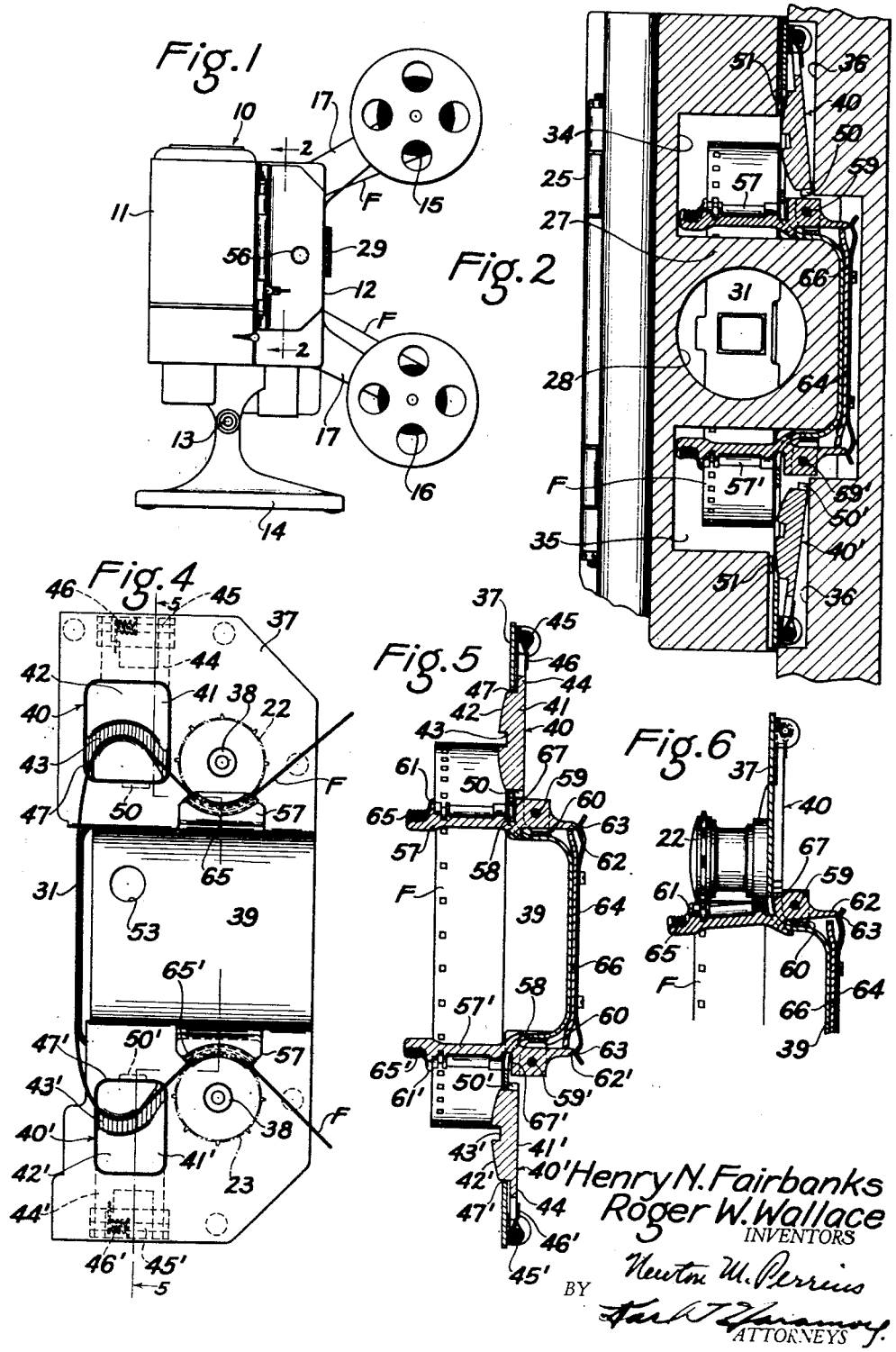

Aug. 24, 1943.  H. N. FAIRBANKS ET AL  2,327,776
THREADING MECHANISM FOR MOTION PICTURE APPARATUS
Filed Aug. 22, 1941  2 Sheets—Sheet 2
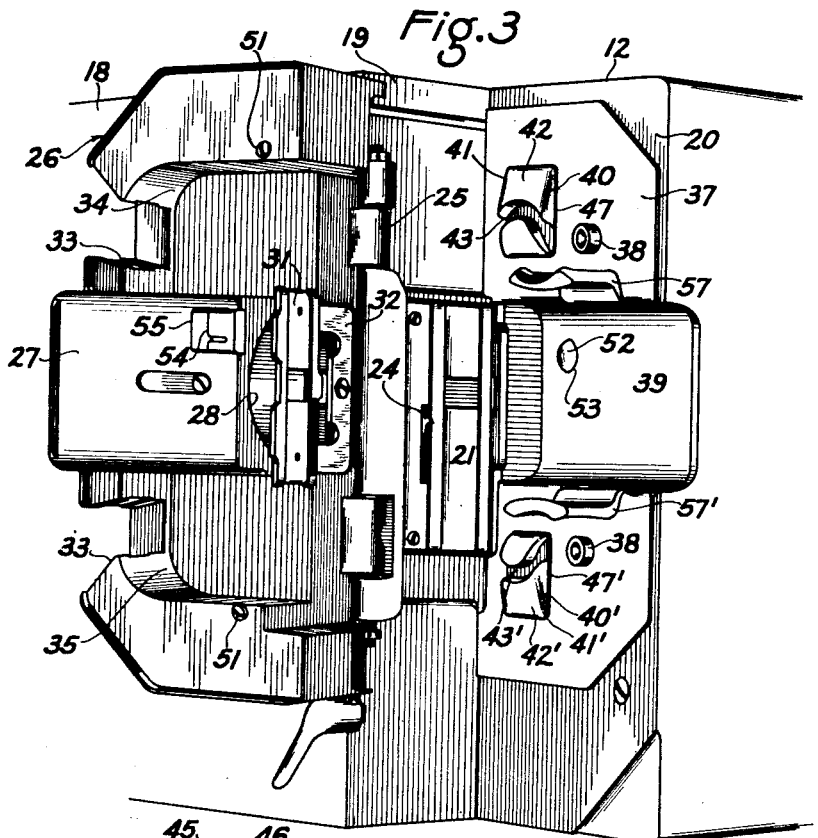
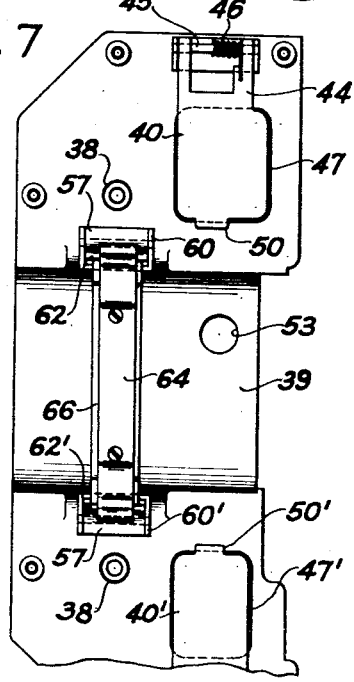
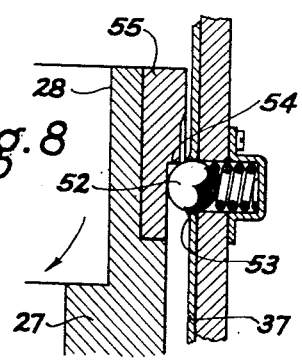
Henry N. Fairbanks
Roger W. Wallace
INVENTORS
BY
ATTORNEYS Patented Aug. 24, 1943

2,327,776

UNITED STATES PATENT OFFICE 2,327,776

THREADING MECHANISM FOR MOTION PICTURE APPARATUS

Henry N. Fairbanks, Rochester, N. Y., and Roger W. Wallace, Washington, D. C., assignors to Eastman Kodak Company, Rochester, N. Y., a corporation of New Jersey Application August 22, 1941, Serial No. 407,926

10 Claims. (Cl. 88—17)

The present invention relates to motion picture apparatus, and particularly to the film-threading mechanism of the same.

One object of the present invention is to provide means for conveniently and accurately determining the usual compensating loops of a motion picture film between an intermittent feeding mechanism and a constant feed mechanism feeding the film to and from the former and so designed that the threading of the film through the feed mechanism can be effected easily in a rapid and accurate manner in subdued light.

Another object of the invention is to provide film loop guides which are adapted to engage both surfaces of the film at one edge to determine the maximum as well as the minimum size of the film loop, and to mount such guides so that they are adapted to move laterally of the normal film path to and from a threading position.

A further object is to provide film loop guides which comprise members having a curved face, the curved face of which includes a slot into which the edge of the film is adapted to snap when drawn across the same to define the desired film loops.

And yet another object is to so arrange such film loop guides that they are adapted to be normally spring-pressed to a threading position when a hinged door carrying a film gate member and giving access to the feeding mechanism is opened, and retracted from engagement with the film by movement of the door to a closed position.

A further object of the invention is the provision of a pivoted film-retaining member serving to hold the film on the sprockets, said retaining member being so arranged as to prevent closing of the door until they are moved to a retaining position relative to the sprockets.

Another object is the provision of a film threading mechanism of the type set forth which permits a film to be accurately threaded through a projector in a rapid manner and composed of a plurality of parts so interrelated as to insure the film being properly threaded through the mechanism before projection can be undertaken.

The novel features that we consider characteristic of our invention are set forth with particularity in the appended claims. The invention itself, however, both as to its organization, and its methods of operation, together with additional objects and advantages thereof, will best be understood from the following description of specific embodiments when read in conjunction with the accompanying drawings, in which, Fig. 1 is the side elevation of a motion picture projector equipped with a threading mechanism constructed in accordance with a preferred embodiment of the present invention, and showing how the film feeding mechanism is covered when the projector is closed up for projection purposes.

Fig. 2 is a partial sectional view taken substantially on line 2—2 of Fig. 1, and showing how the film loop guides of the film threading mechanism are moved from engagement with the film when the door of the projector is closed.

Fig. 3 is a perspective view of the body of the projector with the door open, with the sprockets being omitted for the purpose of clearly showing the invention, Fig. 4 is an elevational view of the body of the projector with the parts shown in the position they assume when the door is open, Fig. 5 is a section taken substantially on line 5—5 of Fig. 4, but with the sprockets omitted for purposes of clarity, Fig. 6 is a view, partly in section and partly in elevation, showing the film retaining means for holding the film on the sprocket pivoted from said sprocket to a threading position, Fig. 7 is a rear elevational view of the parts shown in Fig. 4, and Fig. 8 is a sectional detail showing one suitable form of frictional latching means for the hinged door.

Like reference characters refer to corresponding parts throughout the drawings.

Broadly, the threading mechanism constituting the present invention comprises a pair of film loop guides which are normally moved laterally of the film path to a threading position wherein they are adapted to engage both sides of a film to determine both the maximum and minimum size of film loops desired, these guides being automatically disengaged from contact with the film when a hinged door providing access to the film feeding mechanism is closed and covers the mechanism. The film retaining members for holding the film on the feed sprockets are so arranged that the door cannot be closed until they are moved from a threading position to a running position, thus insuring that the film is properly threaded on the feeding mechanism before projection is attempted.

Referring to the drawings, 10 designates the projector housing broadly, which is inclusive of a lamphouse 11 and a body portion 12 pivoted at 13 to a base 14. The supply and take-up reels 15 and 16, respectively, are adapted to be rotatably mounted on spindles at the end of reel arms 17 projecting from the body portion 12 as is well known in the art, see Fig. 1.

Referring to Figs. 2, 3, 4, and 5, the body portion 12 of the projector comprises a supporting block 18, the corner of which is cut away to form walls 19 and 20 at right angles to one another. The wall 19 is at right angles to projection beam of the projector and includes a stationary gate member 21 across which the film F is adapted to be fed. The other wall 20 has mounted thereon the customary film feeding sprockets 22 and 23 which feed the film from the supply reel to the film gate and from the film gate to the take-up reel, at constant speed as is well known. Film is adapted to be fed intermittently through the film gate by an intermittent feeding mechanism which may constitute a well known type of feed claw 24 projecting through the stationary gate member and operated by a well known mechanism, not shown.

Hinged to the wall 19 at 25 is a door member 26 which is adapted to swing from an open position, shown in Fig. 3 to provide access to the feeding mechanism for threading purposes, to a closed position, shown in Figs. 1 and 2, wherein it covers the film feeding mechanism, and which position it assumes when projection is undertaken. Referring to Figs. 2 and 3, the door member includes a lens tube block 27, having a bore 28 into which the lens mount 29 is adapted to be removably inserted, and which is adapted to be in alignment with the stationary film gate member 21 when the door is in a closed position. On the rear end of the lens tube block is resiliently mounted a movable gate member 31 which is adapted to be brought into film-retaining position with the stationary gate member when the door is closed. This movable gate member is mounted on the end of a double spring arm 32 fixed to the rear end of the lens block so as to be free to move relative to the stationary gate member to resiliently engage the film and at the same time permit the passage of film splices as is well known. The free end of the door is provided with two film passages 33 through which the film is adapted to pass between the sprockets and the reels when the door is closed. The door as a whole is relatively thick, as shown in Fig. 3 to take care of the width of the lens tube block, and is provided with cut-out portions 34 and 35 which are adapted to receive the film feeding and threading mechanism on the wall 20 when the door is closed and permitting free running of the film strip.

Wall 20 of the block 18 is cut out as shown at 36 in Fig. 2 to provide for the mounting of the threading mechanism to be hereinafter described, and this cut-out portion is covered by plate 37 fixed to the wall 20 in any suitable manner and on which plate the threading mechanism is movably mounted. This plate includes bearings 38 in which the shafts for the constant speed sprockets are rotatably mounted. Looking at Fig. 2 it will be noted that the plate 37 intermediate its ends includes a depressed portion 39 which forms a recess into which the lens tube block extends when the door is closed, the end portions of the plate above and below said depressed portion being straight and lying in a vertical plane just to the right of the plane assumed by the edge of the film when the film is in its normal running position.

The loop-forming mechanism constituting the present invention includes two film loop guides 40 and 40', so situated as to determine the size and shape of the compensating film loops at the entrance and exit of the film gate for well known reasons. Inasmuch as each of these film loop guides is structurally the same and is mounted to move in the same manner only one of the same will be described in detail, the corresponding parts of the other being designated by the same reference numerals primed ('). The film loop guide may comprise a substantially rectangular-shaped body portion 41 one face 42 of which is curved and includes a loop-forming slot 43 into which one edge of the film is adapted to extend to be formed into the desired film loop. Each film guide 40 includes an arm 44 pivoted at 45 on the inside face of the plate 37 and normally moved to a threading position by spring 46. When the film loop guides are in their threading position the curved face 42 thereof extends through aperture 47 in the plate 37 and laterally of the plane normally assumed by the edge of the film in its running position. This causes the inner edge of the film to be deformed by the film guide so that the same tends to engage said guide with pressure toward the face of the guide. Looking at Fig. 5 it will be noticed that the film-forming slot 43 is located in the curved face of the film guide on the outside of the high point of the curve thereof. This location of the slot, as will be evident from an inspection of Fig. 5, provides for the end of the wall of the slot determining the minimum size of the film loop extending slightly beyond the end of the opposite wall of the slot. Thus, if in threading the mechanism the film is purposely looped large to engage the portion of the curved face of the guide outside of the slot, and is then foreshortened, the edge of the film will be progressively deformed from its normal running position and when it reaches the slot will automatically snap laterally thereinto due to the fact that it hits the protruding wall of the slot and is momentarily positively arrested regardless of the speed with which the loop is foreshortened.

After the film edge enters the slot in the film guide both the minimum and maximum size of the film loop is definitely determined because the opposite walls of the slot are adapted to engage both sides of the film as the size of the loop tends to change for any reason whatsoever. As is well known, it is necessary to the combined operation of an intermittent and constant feed mechanism on the same film strip to insure the provision of a minimum size compensating loop between the two mechanisms. Also, with all projectors of this type, and particularly the one herein disclosed, it is desirable, or necessary, to control the maximum size of the compensating film loop. In most projectors, and especially the one herein disclosed, the space available for the film loops determines their maximum size. It is always undesirable to have the film loops so large that the film tends to rub against the side of the projector during its feeding movement with the result that abrasion of the picture area is incurred, and with the present projector if the film loops are too large, the door could not be closed without striking the edge of the film. In the present arrangement the movement of the film loop guides to their threading position is limited by stop lug 50 on the body of the guide which comes into abutment with the edge of the aperture 47 and the plate 37.

After the film has been properly threaded on the feeding mechanism, and before projection is started, the door 26 must be closed to bring the movable gate member 31 thereon into film-retaining position relative to the stationary gate member 21 and to bring the projection lens into position. In accordance with the present invention provision is made whereby the film loop guides 40 are automatically moved laterally from engagement with the film loops upon closure of the door and held from such engagement during the time the door is in its closed position. In the present instance this is accomplished by a simple arrangement constituting screws 51 tapped into the inside face of the door, the heads of which screws are adapted to engage and retract the film guides when the door is closed, see Figs. 2 and 3. Any suitable type of projections could be used in place of screws 51, but it is preferable that the projections be adjustable as to the amount they project from the face of the door so that manufacturing and assembly tolerances in the film guides can be easily accounted for to insure the guides being moved to a fully retracted position when the door is closed. Any suitable form of latch may be provided to retain the door in a closed position. For the purpose of illustration, we have shown a friction latch constituting a spring-pressed ball 52 projecting through a spunover opening 53 in the depressed portion 39 of the plate 37, which is adapted to snap behind a shoulder 54 on a latch plate 55 carried by the inside face of the lens tube block, see Figs. 3 and 8. In Fig. 8 the latch parts are shown in position they assume when the door is closed, the arrow indicating the direction of movement of the door necessary to opening the same. A pull on the knob 56 on the outside of the door, see Fig. 1, will cause the shoulder of the latch plate to depress the ball 52 and thereby release the latch.

The film is adapted to be held on the sprockets 22 and 23 by pivoted film-retaining members 57, the sprocket engaging faces of which have a profile complementary to the film supporting part of the sprocket so that the film is engaged only at areas outside the picture area. Each of these two film-retaining members are identical in structure and operation so that only one need be specifically described. These retaining members extend through apertures 58 in plate 37 and are pivoted at 59 on lugs 60 at the rear side of the plate 37 to move between a film-retaining position relative to the sprockets, see Fig. 5, in which a shoulder 61 thereon overhangs the edge of the film on the sprocket, and a threading position, see Fig. 6, in which the shoulder 61 is lowered to permit the film to be inserted edgewise onto the sprockets as is well known in the art.

The inner end of each film-retaining member includes a nose 62 which is adapted to engage a protuberance 63 on the end of a spring member 64 fixed to the rear side of the plate 37. The nose and protuberance are so related that the spring 64 will tend to frictionally hold the retaining members in either of the two positions they are capable of assuming. The retaining members are moved between the retaining and threading positions shown by gripping the finger grip 65 on the outside end thereof. Movement of the retaining members to their retaining position is limited by engagement of the nose thereon with the end of a stop plate 66 fixed to the rear face of the plate 37, see Fig. 5. Movement of the retaining members to their film-threading position is limited by abutment of the corner 67 thereon with the rear face of the plate 37, see Fig. 6.

Referring to Figs. 2 and 6, it will be noted that when the film-retaining members are moved to a retaining position relative to the sprockets the lens tube block on the door will pass between them so that the door can be readily closed. However, if either one, or both, of the retaining members is in a threading position, it extends into the path of the lens tube block so that the door cannot be closed until the member, or members, is moved to a film-retaining position relative to the sprockets with which it is associated. This particular arrangement of parts, therefore, serves to prevent, or discourage, the operator from running the machine until the film is properly threaded on the sprockets, or until the threading operation has been properly completed.

From the above description it will be readily appreciated that the threading mechanism constituting the present invention lends itself to a rapid and accurate threading of a motion picture apparatus. In addition to being adapted to a projector which is neat in appearance, the film feeding mechanism being completely enclosed during projection, the disclosed arrangement prevents, or effectively discourages, any attempt to operate the apparatus until the film is properly threaded through the film feeding mechanism. The several parts in addition to being simple and efficient in operation are so arranged that a projector capable of semi-automatic threading, and having a distinctive appearance, is made possible by the use thereof.

Although we have shown and described certain specific embodiments of our invention, we are aware that many modifications thereof are possible. Our invention, therefore, is not to be restricted except insofar as is necessitated by the scope of the appended claims.

Having thus described our invention, what we claim is new and desire to secure by Letters Patent of the United States is:

1. In a film feeding mechanism the combination with a film gate including a gate member movable to and from film engaging position, means for intermittently feeding a film through said gate, means for constantly feeding a film to said gate, a film loop guide movable to and from a loop forming position between said constant feed means and said gate including two spaced film engaging surfaces and adapted to engage opposite surfaces of said film to determine both the maximum and minimum size of the film loop, and means for moving said loop guide to and from its loop forming position when said gate member is moved from and toward its film engaging position, respectively.

2. In a film feeding mechanism the combination with a film gate including a gate member movable to and from film engaging position, means for intermittently feeding a film through said gate, means for constantly feeding a film to said gate, of a film loop guide movable edgewise of the film path to and from a loop forming position between said constant feed means and said gate and including two spaced film engaging surfaces adapted to engage opposite surfaces of said film to determine both the maximum and minimum size of the film loop, and means for moving said loop guide to and from its loop forming position when said gate member is moved from and toward its film engaging position, respectively.

3. In a film feeding mechanism the combination with a film gate including a gate member movable to and from film engaging position, means for intermittently feeding a film through said gate, means for constantly feeding a film to said gate, of a film loop guide pivoted to move edgewise of the film path to and from a loop forming position between said constant feed means and said gate, and including two spaced film engaging surfaces adapted to engage opposite surfaces of said film to determine both the minimum and maximum size of the film loop, means normally acting on said film loop guide, to move it to its threading position when said gate member is moved from its film engaging position, and means for retracting said loop guide from said threading position when the film gate is moved to its film engaging position.

4. In a film feeding mechanism the combination with a film gate including a gate member movable to and from film engaging position, means for intermittently feeding a film through said gate, means for constantly feeding a film to said gate, of a film loop guide pivoted to move edgewise of the film path to and from a loop forming position between said constant feed means and said gate, said guide comprising a member provided with a slot defining a portion of the film path at the loop adjacent the gate and into which slot one edge of the film is adapted to extend when the guide is in its loop forming position, and means for moving said loop guide to and from its loop forming position when said gate member is moved from and toward its film engaging position, respectively.

5. In a film feeding mechanism the combination with a film gate including a gate member movable to and from film engaging position, means for intermittently feeding a film through said gate, means for constantly feeding a film to said gate, of a film loop guide pivoted to move laterally of the film path to and from a loop forming position between said constant feed means and said gate, said guide comprising a member having a curved face provided with a slot defining a portion of the film path at the loop adjacent the gate and into which slot one edge of the film is adapted to extend when the guide is in its loop forming position, said slot located above the high point of the curve of the face of said guide member whereby the lower wall of the same will extend beyond the upper wall thereof to provide a stop for the edge of the loop of film when it is foreshortened with one edge in engagement with said curved face of the guide, and means for moving said loop guide to and from its loop forming position when said gate member is moved from and toward its film engaging position, respectively.

6. In a film feeding mechanism the combination with a film gate including a gate member movable to and from film engaging position, means for intermittently feeding a film through said gate, means for constantly feeding a film to said gate, of a film loop guide pivoted to move laterally of the film path to and from a loop forming position between said constant feed means and said gate, said guide comprising a member having a curved face which is adapted to extend laterally into the normal film path when in its threading position and which the edge of a film being threaded is adapted to engage with pressure, the curved surface of said guide, above the high point thereof, provided with a slot defining the proper loop size and into which the edge of said film at the loop is adapted to snap when foreshortened across the curved face of said guide, and means for moving said loop guide to and from its loop forming position when said gate member is moved from and toward its film engaging position, respectively.

7. In a film feeding mechanism the combination with a support, a film gate, means for intermittently feeding a film through said gate, means for constantly feeding a film to said gate, a hinged member on said support movable to and from an operative position for threading a film through said mechanism, of a film loop guide pivoted to said support to move laterally of the normal film path to and from a loop forming position between said gate and constant feed means, said guide provided with a slot defining the proper sized film loop and into which one edge of the film is adapted to extend, a spring normally forcing said loop guide to its threading position when said hinged member is moved from its operative position, and means for retracting said guide when said hinged member is moved to its operative position.

8. In a film feeding mechanism the combination with a support, a film gate, means for intermittently feeding a film through said gate, means for constantly feeding a film to said gate, a hinged member on said support movable to and from a closed position for threading a film through said feeding mechanism, a film loop guide pivoted to said support to swing laterally of the normal film path between an inoperative position, wherein it is seated in a recess in said support removed from the film path, and a threading position, wherein it extends laterally into said normal film path, said guide provided with a curved slot defining the film loop and into which one edge of the film strip is adapted to extend when the guide is in its threading position to define the size of the film loop, a spring normally urging said film loop guide to its threading position, and means on said hinged member adapted to engage and move said film loop guide to its inoperative position when said hinged member is moved to its closed position.

9. In a film feeding mechanism the combination with a support, a film gate, means for intermittently feeding a film through said gate, a pair of constant speed sprockets for feeding the film to and from said gate, a pair of film loop guides mounted on said support to move to and from a loop forming position between each sprocket and said gate, said film loop guides adapted to engage both surfaces of the film at one edge to determine both the maximum and minimum size of the film loop, a film retaining member pivoted to said support adjacent each sprocket to move between a film retaining and threading position relative thereto, a hinged member on said support which must be opened to provide access to the feeding mechanism for threading purposes, means for moving said film loop guides to and from said threading position when said door is opened and closed, respectively, and means for positively preventing said hinged member from being closed until said film retaining members are moved to a retaining position relative to said sprockets.

10. In a film feeding mechanism the combination with a support, a film gate, means for intermittently feeding a film through said gate, a pair of constant speed sprockets for feeding the film to and from said gate, a pair of film loop guides mounted on said support to move to and from a loop forming position between each sprocket and said gate, said film loop guides adapted to engage both surfaces of the film at one edge to determine both the maximum and minimum size of the film loop, a film retaining member pivoted to said support adjacent each sprocket to move between a film retaining and threading position relative thereto, a hinged member on said support which must be opened to provide access to the feeding mechanism for threading purposes, means for moving said film loop guides to and from said threading position when said door is opened and closed, respectively, said retaining means so arranged on said support that they project into the path of movement of said door to prevent a closure of the same when they are in a threading position relative to said sprockets, whereby the retaining means must be moved to a retaining position before said door can be closed and the film loop guides retracted from their threading position.

HENRY N. FAIRBANKS.
ROGER W. WALLACE.